Dec. 10, 1929.   J. O. GRADY   1,738,893
CONTAINER COVER
Filed Oct. 11, 1928
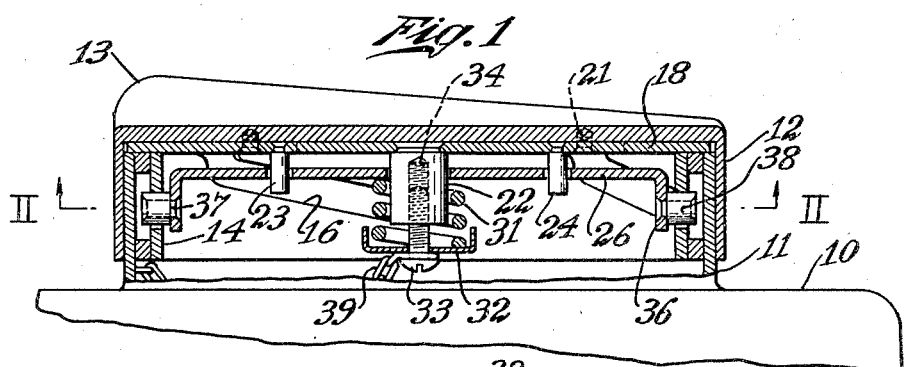
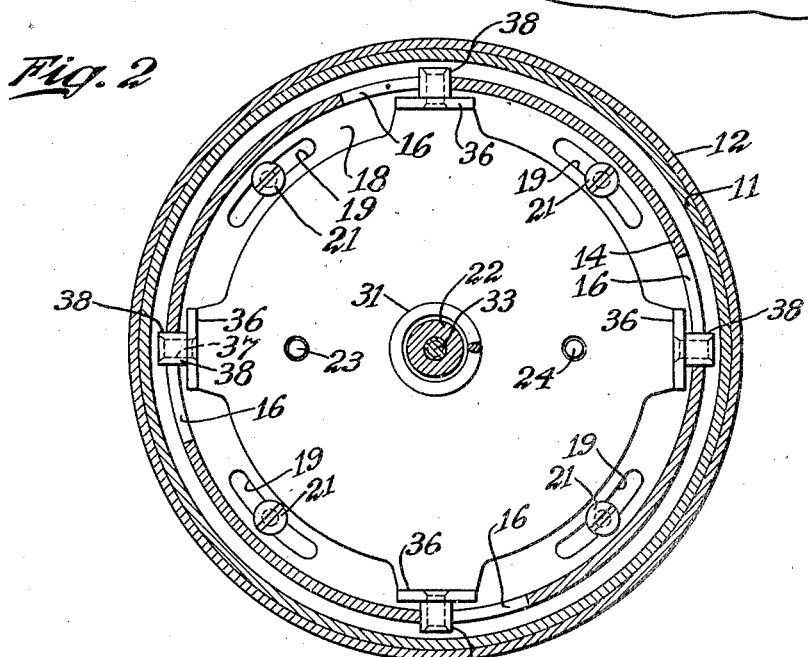
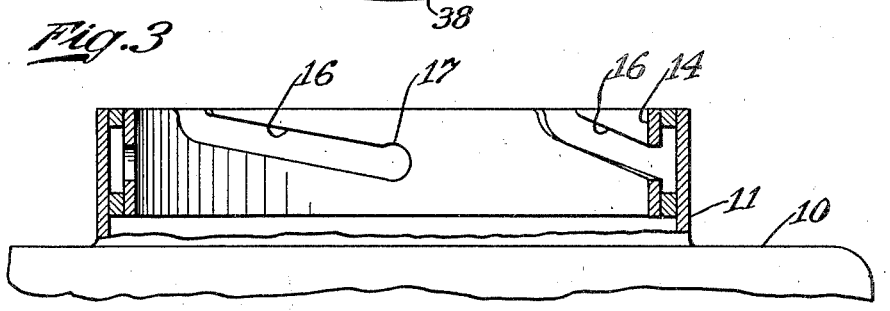
Inventor
John O. Grady
By Johnston & Jennings
Attorneys Patented Dec. 10, 1929

1,738,893

UNITED STATES PATENT OFFICE

JOHN O. GRADY, OF BIRMINGHAM, ALABAMA

CONTAINER COVER

Application filed October 11, 1928. Serial No. 311,843.

My invention relates to covers for containers and has for its object the provision of a device of the character designated which may be readily applied and removed from the container without screwing the cover down and wherein the angular relation of the cover and the container may be readily changed.

A further object of my invention is to provide a cover especially adapted for automobile radiators which usually carry an ornament of some character and which may be readily secured to and removed from the radiator without screwing and wherein the angular relation of the ornament to the automobile body may be readily adjusted.

A more specific object of my invention is to provide a fastening means for container covers which shall be readily attachable to and removable from the cover whereby a single size of fastener may be adapted for a number of sizes of covers.

Briefly, my invention comprises a flanged cover fitting over the neck of the container, a plurality of inclined slots being provided in the neck. Yieldingly supported by the cover is a spider having radially extending projections to fit into the slots and by means of which the cover is secured to the plate. The spider is secured to the cover in a manner permitting angular adjustment thereof, thereby providing means whereby the cover is angularly adjustable with respect to the container.

Apparatus embodying features of my invention is illustrated in the accompanying drawings, forming a part of this application, wherein—

Fig. 1 is a vertical sectional view of an automobile radiator cap having my improved fastening means;

Fig. 2 is a sectional view taken along the line II—II of Fig. 1; and

Fig. 3 is a view similar to Fig. 1, but showing the cover removed.

Referring to the drawings for a better understanding of my invention, I show a fragment 10 of an automobile radiator having a filling neck 11 and over which fits a flanged cover 12. As is usual with radiator cap covers, an ornament 13 which, for the purpose of illustration, is shown as being in the form of a vane, is provided on the cover and which it is desired to maintain in line with the longitudinal axis of the automobile when the cover is secured in place.

Fitting within the neck 11 is a bushing 14 which is provided with a plurality of downwardly inclined slots 16 which open at the top of the bushing and which are provided with slightly upturned ends 17. Fitting within the cover 12 is a plate 18 having a plurality of arcuate slots 19 therein through which screws 21 extend for securing the plate to the cover. The slots 19 provide means whereby the plate may be adjusted angularly with respect to the cover.

Carried by the plate 18 is a center post 22 and guide pins 23 and 24. A spider 26, provided with a central opening 27, fits over the post 22 and is also provided with smaller openings 28 and 29 fitting over the guide pins 23 and 24. The spider 26 is held in place by means of a spring 31 which surrounds the post 22 and bears against the spider. Its other end bears against an abutment 32 which is held in place by a screw 33 which enters a threaded opening 34 in the post 22. The screw 33 may be advanced or retarded in the opening 34 and the tension of the spring 31 thereby adjusted.

Formed on the spider 26 are a plurality of down-turned arms 36 through which pass radially extending pins 37 and carried by the pins 37 are small rollers 38. The spacing of the rollers 38 around the spider 26 corresponds to the spacing of the slots 16 in the neck 14 so that when it is desired to secure the cover in place on the radiator it is only necessary to enter the rollers in the slots 16, and give the cover a partial turn until the rollers enter the upturned ends 17 of the slots 16. When thus in place, the spring 31 holds the rollers in firm engagement with the slots and prevents the cover from coming loose. To remove the cover, a partial turn in the opposite direction releases the rollers from the upturned ends 17 of the slots 16, whereupon the cover may be readily removed. Should it be desired to change the angle of the ornament 13 with respect to the cover, it may be done by loosening the screws 21 and rotating the plate 18 the necessary amount. In order that the cover may not be dropped and lost when removed, I provide a chain 39 which is secured to the screw 33 and to the neck 11.

It will be apparent, with the arrangement shown, that covers of different sizes may be used with a single size of spider 26, bushing 14 and plate 18 and that the fastening means shown does not have to be especially designed for each size of cover. It will accordingly be apparent that I have devised an angularly adjustable fastening means for radiator covers which is simple of design and of operation and which is readily interchangeable with different sizes of covers.

While I have shown by invention in but one form, it will be obvious to those skilled in the art that it is not so limited, but is susceptible of various changes and modifications without departing from the spirit thereof and I desire therefore that only such limitations shall be placed thereupon as are imposed by the prior art or as are specifically set forth in the appended claims.

What I claim is:

1. In a fastener for container covers, a plurality of cam surfaced fastening elements carried by the container, a spider carried by the cover, other fastening elements carried by the spider for cooperation with the fastening elements carried by the container, and means for angularly adjusting the spider with respect to the cover.

2. In a fastener for container covers, a neck on the container and carrying inclined fastening elements, a spring pressed spider carried by the cover, projections carried by the spider and adapted to coact with the fastening elements carried by the neck, and means for angularly adjusting the spider with respect to the cover.

3. The combination with a container having a circular walled opening therein and a flanged cover fitting over the wall, of a plurality of fastening elements inclined to the axis of the walled opening and positioned around said wall, a spider carried by the cover, means for angularly adjusting the spider with respect to the cover, a spring for biasing the spider toward the cover, and radially projecting fastening means carried by the spider and adapted to coact with the fastening elements.

4. In a fastening means for a container cover, said container having a circular walled opening and said cover being flanged to fit over the circular wall, a bushing fitting within the walled opening and having provided therein a plurality of slots inclined to the axis of the bushing and opening at the top of the bushing, a spider secured to the cover, means for angularly adjusting the spider with respect to the cover, and radial projections carried by the spider and adapted to enter the slots to secure the cover in place.

5. In a fastening means for a container cover, said container having a circular walled opening and said cover being flanged to fit over the circular wall, a bushing fitting within the walled opening and having provided therein a plurality of slots inclined to the axis of the bushing and opening at the top of the bushing, a spider secured to the cover, means for angularly adjusting the spider with respect to the cover, radial projections carried by the spider and adapted to enter the slots to secure the cover in place, and spring means for holding the projections in firm engagement with the walls of the slots.

6. In a radiator cover fastening means, said radiator having a circular neck, a bushing fitting within the neck and having a plurality of inclined slots opening upwardly, a plate having a plurality of arcuate slots therein, screws for holding the plate to the cover and passing through the slots, a spider yieldingly supported by the plate, and radial projections on the spider for fitting in the inclined slots.

7. In a radiator cover fastening means, said radiator having a circular neck, a bushing fitting within the neck and having a plurality of inclined slots opening upwardly, a plate having a plurality of arcuate slots therein, screws for holding the plate to the cover and passing through the slots, a centering pin carried by the plate, a spider fitting over the centering pin, a spring carried by the centering pin for biasing the spider toward the cover, and radially extending rollers carried by the spider for fitting in the slots.

8. In a radiator cover fastening means, said radiator having a circular neck, a bushing fitting within the neck and having a plurality of inclined slots opening upwardly, a plate having a plurality of arcuate slots therein, screws for holding the plate to the cover and passing through the slots, a centering pin carried by the plate, a spider fitting over the centering pin, a spring carried by the centering pin for biasing the spider toward the cover, means for adjusting the tension of the spring, and radially extending rollers carried by the spider for fitting in the slots.

In testimony whereof I affix my signature.

JOHN O. GRADY.